United States Patent [19]

Damiral

[11] Patent Number: 5,178,514
[45] Date of Patent: Jan. 12, 1993

[54] COOLING OF GAS TURBINE SHROUD RINGS

[75] Inventor: Peter A. Damiral, Derby, United Kingdom

[73] Assignee: Rolls-Royce plc, London, England

[21] Appl. No.: 633,265

[22] Filed: Apr. 30, 1984

[30] Foreign Application Priority Data

May 26, 1983 [GB] United Kingdom ............... 8314668

[51] Int. Cl.$^5$ .................................. F01B 3/22
[52] U.S. Cl. .................... 415/114; 415/115; 415/139; 60/266; 60/912
[58] Field of Search ............ 415/114, 115, 116, 139; 60/266, 912

[56] References Cited

U.S. PATENT DOCUMENTS

| | | | |
|---|---|---|---|
| 2,633,327 | 3/1953 | McDowell | 415/114 X |
| 3,751,909 | 8/1973 | Kohler | 415/115 X |
| 3,756,020 | 9/1973 | Moskowitz et al. | 415/114 X |
| 3,864,056 | 2/1975 | Gabriel et al. | 415/136 X |
| 3,957,391 | 5/1976 | Vollinger | 415/136 X |
| 4,136,516 | 1/1979 | Corsmeier | 415/114 X |
| 4,149,824 | 4/1979 | Adamson | 60/39.09 X |
| 4,155,680 | 5/1979 | Linko, III et al. | 60/39.09 X |
| 4,292,008 | 9/1981 | Grosjean et al. | 415/115 |
| 4,505,639 | 3/1985 | Groess et al. | 415/115 X |
| 4,566,851 | 1/1986 | Comeau et al. | 415/139 |

Primary Examiner—Peter A. Nelson
Attorney, Agent, or Firm—Cushman, Darby & Cushman

[57] ABSTRACT

A gas turbine engine is provided with an annular array of rotor blades which are surrounded by a shroud ring. The shroud ring includes a number of adjacent heat pipes which are of the variable conductance type. The heat pipes each have a portion which is externally of the shroud ring which portion is in turn divided into two parts. The first part is exposed to a flow of cooling air while the second part contains a buffer which operationally varies the conductance of the heat pipe, in accordance with the temperature of air which is tapped from the high pressure compressor of the engine. This serves to ensure that the shroud ring remains substantially isothermal and provides control over the clearance between the tips of the rotary blades and the shroud ring through thermal control of the shroud ring.

8 Claims, 2 Drawing Sheets

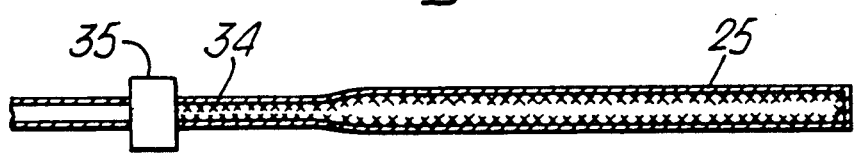
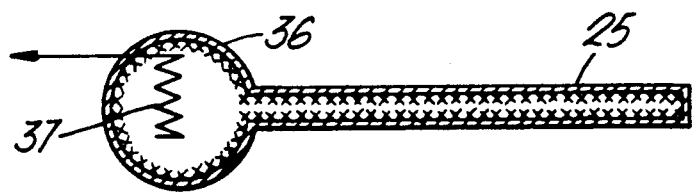

COOLING OF GAS TURBINE SHROUD RINGS

This invention relates to the cooling of gas turbine engine shroud rings.

It is common practice to provide the turbine of a gas turbine engine with at least one shroud ring. It surrounds an annular array of rotary turbine aerofoil blades within the turbine and serves to define a radially outer portion of the gas passage through the turbine. The temperatures and thermal gradients conventionally encountered within turbines are extremely high and consequently it is common practice to provide shroud rings with some form of cooling in order to ensure that they are capable of withstanding these temperatures. However despite such cooling, shroud rings are still subject to thermal gradients which can lead to their distortion.

One way in which thermal gradients can be substantially eliminated is to have a shroud ring which is in the form of a heat pipe. Since heat pipes are generally isothermal in operation, they are not usually prone to thermal gradients and the distortion associated therewith. However, heat pipes are vulnerable to failure. If this happens during engine operation, the likelihood is that thermal gradients will be immediately established within the shroud ring, thereby causing its distortion and possible engagement with the rotary aerofoil turbine blades which it surrounds.

It is an object of the present invention to provide a gas turbine engine having a cooled shroud ring which substantially avoids the aforesaid disadvantage of both conventional shroud rings and shroud rings which are in the form of a heat pipe.

According to the present invention, a gas turbine engine includes a turbine having an annular gas passage extending therethrough, an annular array of rotor blades positioned within said gas passage and a shroud ring surrounding said array of rotor blades and mounted generally concentric therewith, said shroud ring defining a portion of the radially outer extent of said gas passage through said turbine and including a plurality of adjacent variable conductance heat pipes, each having first and second portions which are respectively located internally and externally of said shroud ring, each of said externally located heat pipe portions being divided into two parts, a first part which is contiguous with the heat pipe portion internally of said shroud ring and is operationally exposed to a flow of cooling fluid, and a second part which is not exposed to said cooling fluid and comprises buffering means to operationally vary the heat conducting characteristic of said heat pipe in accordance with the magnitude of an operationally variable characteristic of said engine.

The invention will now be described, by way of example, with reference to the accompanying drawings in which:

FIG. 4 is a sectioned side view of an alternative form of heat pipe to that shown in FIG. 2.

FIG. 5 is a sectioned side view of a further alternative form of heat pipe to that shown in FIG. 2.

FIG. 6 is a sectioned side view of a still further alternative form of heat pipe to that shown in FIG. 2.

Figure 1:
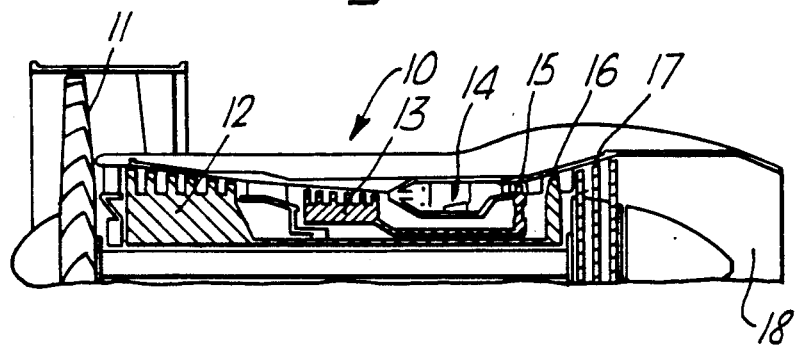
FIG. 1 is a sectioned side view of the upper portion of a gas turbine engine in accordance with the present invention.

With reference to FIG. 1, a ducted fan gas turbine engine generally indicated at 10 comprises, in axial flow series, a fan 11, intermediate and high pressure compressors 12 and 13, combustion equipment 14, high, intermediate and low pressure turbines 15, 16 and 17 which are drivingly interconnected with the fan 11 and compressors 12 and 13, and a propulsion nozzle 18. The engine 10 functions in the conventional manner with air being drawn in and compressed by the fan 11 and the compressors 12 and 13. The compressed air is mixed with fuel and the mixture combusted in the combustion equipment 14. The resultant exhaust gases expand through the turbines 15, 16 and 17 and are exhausted to atmosphere through the propulsion nozzle 18. Propulsive thrust is provided by both the exhaust flow through the propulsion nozzle 18 and air from the fan 11 which does not pass into the compressors 12 and 13.

Figure 2:
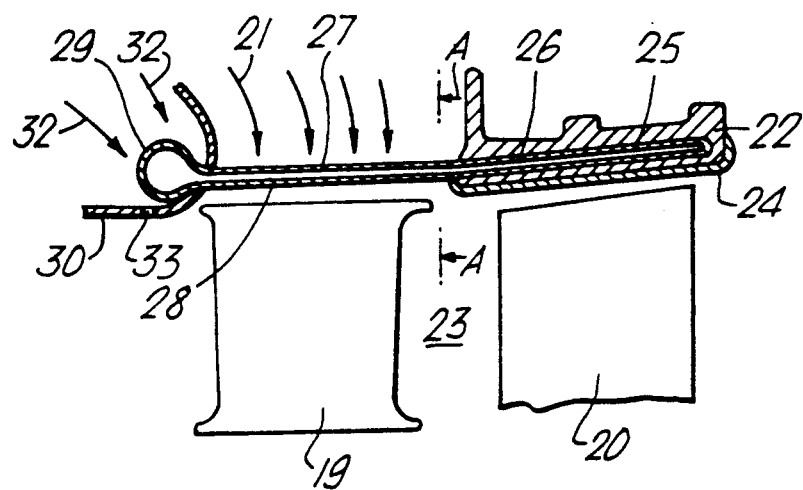
FIG 2 is a sectioned side view of a portion of the turbine of the engine shown in FIG. 1, the portion including a heat pipe.

Part of the high pressure turbine 15 is shown on a larger scale in FIG. 2. It comprises an annular array of stator aerofoil vanes, one of which can be seen at 19, downstream of which is an annular array of rotary aerofoil blades, one of which can be seen at 20. The stator vanes 19 are of conventional design and hollow to permit the flow of cooling air derived from the intermediate pressure compressor 12 and flowing in the direction indicated by the arrows 21, to pass through them. The rotary blades 20 are also of conventional design and are surrounded by a shroud ring 22. The shroud ring 22 is generally concentric with the axis of rotation of the rotor blades 20 and defines a portion of the radially outer extent of the annular gas passage 23 through the turbine 15.

The radially inner surface of the shroud ring 22 is provided with a ceramic coating 24 in order to reduce the cooling heat flux required to maintain the shroud ring 22 at suitable temperatures. The shroud ring 22 also includes a plurality of heat pipes, one of which 25 can be seen in the drawing, which are positioned adjacent each other. They are each positioned generally parallel with the axis of the engine 10 and are divided into two portions 26 and 27. The first portion 26 is located internally of the shroud ring 22 whilst the second portion 27 is located externally of the shroud ring 22 and extends in a generally upstream direction with respect to the gas flow through the annular duct 23.

Each internal heat pipe portion 27 is in turn divided into two parts 28 and 29. The first part 28 is contiguous with the heat pipe portion 26 which is located internally of the shroud ring 22 and extends across the radially outer extent of one of the stator vanes 19. Thus one heat pipe part 28 extends across the radially outer extent of each stator vane 19 so as to be exposed to the flow of cooling air which is directed into the stator vanes 19. Each second part 29 is positioned upstream of the stator vanes 19 so as not to be exposed to the flow of cooling air which is directed into the stator vanes 19. An annular wall 30, part of which can be seen in the drawing, provides additional separation of the heat pipe part 29 from the cooling air flow into the stator vanes 19.

Figure 3:
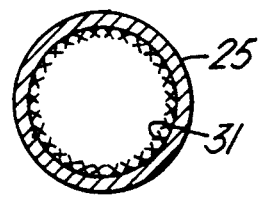
FIG. 3 is a view on section line A—A of FIG. 2.

The heat pipes 25 are each of conventional construction in that they comprise a sealed evacuated tube, the internal wall of which, as can be seen in FIG. 3, is covered by a wire mesh 31. The interior of each heat pipe 25 contains a small amount of heat transfer medium, such a sodium, potassium, caesium or mercury, which is evaporated at the temperatures which the shroud ring 22 reaches. The vapour passes along the heat pipe 25 interior until it reaches the heat pipe part 28 which is cooled by the flow of cooling air to the stator vanes 19. The vapour is there cooled to such an extent that it condenses on the wire mesh 31 whereupon the resultant liquid is capillary pumped by the wire mesh 31 back into the heat pipe portion 26 which is internally of the shroud ring 22. There evaporation of the liquid takes and the whole cycle is repeated. This has the effect of rendering each heat pipe 25 generally isothermal so that heat from the shroud ring 22 is transferred to the flow of cooling air into the stator vanes 19, thereby effecting a temperature reduction of the shroud ring 22.

The part 29 of each heat pipe 25 which is separated from the cooling air flow by the annular wall 30 is not of tubular form. It is instead generally bulb-shaped and contains a small quantity of a buffer gas which will not react with the heat transfer medium of the heat pipe 25. An inert gas is preferred for this purpose.

The buffer gas within the bulb-shaped heat pipe part 29 is heated by a flow of hot air as indicated by the arrows 32. The source of the hot air is selected such that it supplies the air at a temperature which varies with the operational mode of the engine 10. A convenient source of air would be the high pressure compressor 13. As the temperature of the gas within the heat pipe part 29 rises, the gas expands so as to increase the gas (and vapour) pressure of the heat transfer liquid within heat pipe part 28. This has the effect of increasing the temperature of the portion 26 necessary for the asset of heat conduction by the boiling of the heat transfer liquid within it. After the hot air has heated the bulb-shaped heat pipe part 29, it is exhausted into the gas passage 23 through a plurality of apertures 33 which are provided in the annular wall 30.

It will be seen therefore that each heat pipe 25 is of the variable conductance type, the inert gas acting as a buffer which varies its effective heat conductance. This being so, the heat pipes 25 serve a dual function. Firstly they provide a means for cooling the shroud ring 22 and also ensure that the shroud ring 22 is substantially isothermal during operation. Secondly, since they are of variable conductance, they provide a means for varying the temperature of the shroud ring 22. Thus the shroud ring 22 is prevented from reaching temperatures at which it could be damaged. Moreover since it is substantially isothermal, there is less likelihood that it will distort than is the case with shroud rings which are subject to thermal gradients. In the event of the isolated failure of one of the heat pipes 22 there is less likelihood of thermal distortion of the shroud ring 22 than would be the case with a shroud ring which is constituted by a single or small number of heat pipes. A further advantage is that since the evaporator temperature is controlled by the buffer gas pressure and is largely independent of cooling heat flux, if any part of the ceramic coating 24 should fail and become detached from the shroud ring 22, the additional heat flux to which the shroud ring 22 would be exposed would not result in a localized temperature increase of the shroud ring 22. Instead, the heat pipes in the affected area would conduct the additional heat flux to the portions thereof which are situated in the path of the cooling air flow to the stator vanes 19.

The ability to vary the temperature of the shroud ring 22 which is facilitated by the heat pipes 25 gives rise to a means for controlling the clearance between the tips of the rotary aerofoil blades 20 and the shroud ring 22 in accordance with an operationally variable characteristic of the engine 10. In the embodiment described above, the variable characteristic is the temperature of the air which is tapped from the high pressure compressor 13 and is directed on to the bulb-shaped heat pipe parts 29. As the temperature of the air tapped from the high pressure compressor 13 increases with the speed of the engine 10, the temperature of the inert buffer gas within the bulb-shaped heat pipe parts 29 increases correspondingly. The inert gas expands, thereby effectively reducing the conductivity of the heat pipes 25 and causing a rise in the temperature of the shroud ring 22. The shroud ring 22 increases in diameter as a result of thermal expansion, thereby ensuring that the clearance between the tips of the rotary aerofoil blades 20 and the shroud ring 22 remain at a level which is consistent with as little exhaust gas leakage across the clearance as possible. Such an increase in shroud ring 22 diameter is necessary in view of the high rate of thermal expansion of the rotary aerofoil blades 20 as a result of their direct exposure to the hot gas stream passing through the gas passage 23.

In view of the low level of heat flux which is required to control the pressure of the buffer gas, the bulb-shaped part 29 of each heat pipe 25 may be coated with a thermal insulation material. This ensures that the temperature of the shroud ring 22 will respond to operational changes in the high pressure turbine 15 in a similar manner to the other components of the high pressure turbine 15.

The temperature of the gases passing through the gas passage 23 is a function of the temperature of the air which is compressed by the high pressure compressor 13. It will be appreciated however that other operationally variable characteristics of the engine 10 could be utilized in varying the conductance of the heat pipes 25 and hence the clearance between the tips of the rotary aerofoil blades 20 and the shroud ring 22. Moreover alternative forms of variable conductance heat pipes 25 could be used to provide thermal control of the shroud ring 22.

Three examples of different types of variable conductance heat pipes 25 are shown in FIGS. 4-6. The heat pipe 25 shown in FIG. 4 is of generally conventional construction, its unconventional feature being the provision of a reduced diameter portion 34, part of which can be seen in the drawings which is in communication with a source of an inert buffer gas. Variation in the pressure of the gas causes a corresponding variation in the conductance of the heat pipe 25 in the same manner as described earlier.

The heat pipe 25 shown in FIG. 5 is also provided with a reduced diameter portion 34. However in this particular embodiment, a passive pressure amplifier 35 is located on the reduced diameter portion 34. An inert gas is present in the heat pipe side of reduced diameter portion 34. However the other side of the reduced diameter portion is in direct communication with a suitable stage of the low or high pressure compressors 12, 13. The arrangement is such that variations in the pressure of the air in the compressor side of the reduced diameter portion 34 causes the passive pressure amplifier 35 to exert corresponding pressure changes upon the inert gas within the reduced diameter portion 34. This in turn results in corresponding variations in the conductances of the heat pipe 25.

The heat pipe 25 shown in FIG. 6 is similar in construction to the heat pipe 25 shown in FIG. 2 in that it is provided with a bulb-shaped part 36. However, the bulb-shaped part 36 contains a small amount of a suitable fluid which may be vapourised by a heating element 37 located within the part 36. The vapourised conductance. This being so the amount of fluid which is vapourised is proportional to the conductance of the heat pipe. The heating element 37 is linked to a suitable device (not shown) which measures the clearance between the blade 20 tips and the shroud ring 22, and provides an output signal which is proportional to the measured clearance. The arrangement is such that if the clearance between the blade 20 tips and the shroud ring 22 becomes too small, the heating element 37 is activated to heat up the fluid within the bulb-shaped part 36 and thereby reduces the conductance of the heat pipe 25. This has the effect of producing an increase in the temperature of the shroud ring 22 so that it thermally expands to increase the blade 20 tip clearance. Likewise if the blade 20 tip clearance becomes too large, the heating element 37 is deactivated so that the heat pipe 25 conductance increases and the temperature of the shroud ring 22 decreases. The shroud ring 22 consequently thermally contracts, thereby reducing the blade 20 tip clearance.

It will be appreciated that although several alternative forms of variable conductance heat pipes have been described above, other forms are known which could be utilised in gas turbine engines in accordance with the present invention.

I claim:

1. A gas turbine engine including a turbine having an annular gas passage extending therethrough, an annular array of rotor blades mounted for rotation within said gas passage, and a shroud ring surrounding said array of rotor blades and mounted generally concentric therewith, said shroud ring defining a portion of the radially outer extent of said gas passage through said turbine and including a plurality of adjacent, variable conductance heat pipes, each having first and second portions which are respectively located internally and externally of said shroud ring, each of said externally located heat pipe portions being divided into first and second parts, said first part being contiguous with the respective heatpipe portion internal of said shroud ring, means for directing a flow of cooling fluid over the first parts of the externally located heatpipe portions during operation of said engine, and the second part of each externally located heat pipe portion being so located as not to be exposed to said cooling fluid and comprising buffering means to operationally vary the heat conducting characteristic of said heat pipe with the magnitude of an operationally variable characteristic of said engine.

2. A gas turbine engine as claimed in claim 1 wherein said buffering means comprises an inert gas which occupies a portion of the interior of each of said heat pipes.

3. A gas turbine engine as claimed in claim 2 wherein said operationally variable characteristic of said engine is the temperature of air derived from a high pressure portion of the compressor of said engine, said air being directed onto the exterior of the portion of said heat pipe which contains said inert gas to provide variations in the pressure of said inert gas within said heat pipe interior and hence the heat conducting characteristic of said heat pipe.

4. A gas turbine engine as claimed in claim 1 wherein said heat pipes are positioned generally parallel with the axis of said engine.

5. A gas turbine engine as claimed in claim 1 wherein said cooling fluid is air.

6. A gas turbine engine as claimed in claim 1 wherein said turbine is provided with an annular array of hollow stator vanes which are positioned adjacent said array of rotor blades, and wherein said means for directing cooling fluid also directs the cooling fluid into the interiors or said vanes after the cooling fluid has passed over said first parts of said externally located heat pipe portions.

7. A gas turbine engine as claimed in claim 1 wherein said operationally variable characteristic of said engine is the pressure of air derived from a portion of the compressor of said engine.

8. A gas turbine engine as claimed in claim 1 wherein said operationally variable characteristic of said engine is the clearance between the tips of said array of rotor blades and said shroud ring.

* * * * *